United States Patent [19]

Salmon

[11] 4,107,422

[45] Aug. 15, 1978

[54] SOLVENT REMOVAL FROM POLYMER SOLUTIONS

[75] Inventor: Emigdio J. Salmon, Bartlesville, Okla.

[73] Assignee: Phillips Petroleum Company, Bartlesville, Okla.

[21] Appl. No.: 764,928

[22] Filed: Feb. 2, 1977

[51] Int. Cl.² ............................ C08F 6/12; C08F 6/10
[52] U.S. Cl. .................................. 528/502; 23/280; 159/2 E; 425/144
[58] Field of Search ........................................ 528/502

[56] References Cited

U.S. PATENT DOCUMENTS

| | | | |
|---|---|---|---|
| 3,035,306 | 5/1962 | Rossiter | 18/12 |
| 3,036,056 | 5/1962 | Rion | 260/94.7 |
| 3,078,511 | 2/1963 | Street | 18/12 |
| 3,078,512 | 2/1963 | DeHaven | 18/12 |
| 3,476,736 | 11/1969 | Kahre | 260/93.7 |
| 3,799,234 | 2/1971 | Skidmore | 159/2 E |

*Primary Examiner*—Stanford M. Levin

[57] ABSTRACT

By cooling the barrel of a devolatilizing extruder rather than by heating it, both the solvent removal rate and the polymer feed rate could be increased; furthermore, the power surging of the motor driving the extruder was largely reduced or even eliminated by the process of this invention.

8 Claims, 3 Drawing Figures

SOLVENT REMOVAL FROM POLYMER SOLUTIONS

This invention relates to polymer recovery. More specifically, this invention relates to a process for removing solvent from a liquid mixture of polymer and solvent.

BACKGROUND OF THE INVENTION

Various polymers are produced by procedures in which a solution of the desired polymer has to be separated into the polymer and the solvent. Particularly, for synthetic rubber production, this solvent removal constitutes a major problem. For high quality polymers frequently high purity solvents are used. The quantity of such solvents lies normally in the range of 3-10 parts by weight of solvent or diluent per 1 part by weight of polymer. Essentially complete recovery of the solvent constitutes an important economic consideration.

It is known in the art that the solvent or diluent of a polymer solution can be and preferably is removed by evaporating this solvent. It is also known that a devolatilizing extruder can be used for this purpose. The extruder utilizes, at least partly, mechanically introduced energy to evaporate the solvent. The cost of such an energy input becomes quite high and large capital investments are necessary for installing these devolatilizing extruders.

A general problem in connection with devolatilizing extruders resides in the throughput. The capacity of, e.g., rubber plants is frequently limited by the devolatilizing extruders which constitute a bottleneck in the production. An increased throughput through these extruders would increase the overall capacity of the plant without the necessity of adding further equipment and thus essentially without further capital expenditure. Furthermore, a serious technical problem occurs in connection with devolatilizing extruders. For reasons that are not quite understood, a fairly severe surging of the power input to the motor driving the extruder occurs. To increase throughput and solvent removal rate and to reduce the power surging of a devolatilizing extruder are two of the main problems that are solved by the present invention.

The Invention

It is thus one object of this invention to provide a process for the removal of solvent from a liquid polymer/solvent mixture.

A further object of this invention is to provide an apparatus for the removal of solvent from a liquid polymer/solvent mixture.

Another object of this invention is to increase the throughput and solvent removal rate of a devolatilizing extruder.

A further object of this invention is to reduce the power surging in the motors driving devolatilizing extruders.

In accordance with this invention, I have now found that by cooling the devolatilizing extruder rather than by heating it, a higher solvent removal rate, a higher throughput and a smaller power surging of the motor driving the extruder can be achieved. Surprisingly, by cooling the barrel of the devolatilizing extruder that has been heated heretofore, the advantages mentioned are achieved. The replacement of steam heating of the liquid polymer/solvent mixture by water cooling in the area where the mixture is subjected to mechanical working results in a more efficient operation of devolatilizing extruders, particularly permitting higher processing rates to be maintained while avoiding motor overloads. Thus the onstream time of the equipment is increased and the loss caused by off-specification rubber is reduced.

The invention achieves a very substantial reduction in power surging of the motor driving the extruder. It is believed that the power surging is associated with the viscosity of the polymer. Particularly for polymer solutions having a very strong change of viscosity associated with a small amount of solvent evaporation the invention is applicable. Although not all the details of the mechanisms involved are fully understood, it is believed that the cooling of the extruder barrel achieves a control of the amount of viscosity change; the viscosity is gradually changed. Because the viscosity is increased, it is believed that the viscosity of the solution in a given section of the barrel is kept essentially constant. The average energy input into the extruder because of the higher viscosity is increased, but the power surging is very substantially reduced.

The present invention, therefore, provides a process for removing the solvent from a liquid polymer/solvent mixture which process comprises introducing the liquid polymer/solvent mixture into an extruder, operating the extruder to volatilize at least a portion of the solvent, cooling the liquid mixture in the extruder and removing solvent vapor and at least partially devolatilized polymer from the extruder.

The term "liquid polymer/solvent mixture" is intended to characterize a liquid comprising a polymer and a volatile solvent; this liquid mixture may be an actual solution of the polymer in the solvent. Frequently, however, and particularly at the end of the devolatilization process, only a small quantity of solvent remains in the mixture. The mixture then is a polymer having some solvent "dissolved" therein.

The process of this invention is applicable to single phase liquid mixtures of polymers and solvents. In particular, however, and preferably, the process of this invention is carried out for devolatilizing mixtures of polymers or copolymers of elastomers and hydrocarbon solvents. The polymers and copolymers of butadiene, isoprene, styrene and methylstyrenes and the respective hydrocarbon solvents, preferably cyclohexane and methylcyclopentane, are particularly preferred. The most preferred groups of these polymers are those having a weight average molecular weight of above about 250,000.

The operating conditions of the process are such that the section of the extruder where the highest amount of mechanical work is consumed, generally the metering section, is cooled in accordance with this invention. This preferably is done by circulating a coolant through a jacket surrounding the respective section of the barrel of the extruder. The cooling is normally not commenced before the liquid polymer/solvent mixture has reached working temperature which is a function of the polymer viscosity, the solids concentration in the feed and the amount of solvent removed in the extruder. This working temperature is normally in the range of 250°-400° F (121°-204° C). The coolant introduced into the jacket of the extruder is at a temperature below the working temperature of the polymer, preferably at least about 50° F below this working temperature.

The extruders useful for the practice of this invention are general devolatilizing extruders. These extruders are commercially available. Usually these devolatilizing extruders are provided with a cylindrical barrel that is jacketed on the outside for the circulation of temperature control fluids through these jackets. Coaxially with the internal cylinder of the barrel a screw is rotatably arranged leaving a gap between the screw and the barrel through which the liquid polymer/solvent mixture is moved. Screw depth is normally in the range of about 0.05 to about 0.5 inches ($1.27 \times 10^{-3}$ to $1.27 \times 10^{-2}$ m). This gap refers to the distance between the surface of the barrel and the base of the screw thread. The gap is therefore half the difference of the barrel internal diameter and the stem external diameter.

The area where most of the mechanical work is put into the liquid polymer/solvent mixture usually has a gap between the stem and the barrel of about 0.05 to 0.5 inches ($1.27 \times 10^{-3}$ to $1.27 \times 10^{-2}$ m).

The screw of the devolatilizing extruder has a configuration which during rotation propagates the liquid polymer/solvent mixture through the extruder. The screw may be and frequently is composed of sections with different depths and with different pitches.

A preferred embodiment of this invention provides for a devolatilization process wherein the size of the motor power oscillations or surging controls the degree of cooling of the liquid polymer/solvent mixture. In this process the surging of the motor after the polymer/solvent mixture has reached its working temperature is measured. A surge signal is generated responsive to this measurement. This surge signal is then converted into a cooling control signal that increases the flow rate of the coolant and/or decreases its temperature when the surge signal indicates a motor power surge above a setpoint and vice versa.

In accordance with another embodiment of this invention, there is provided an apparatus for devolatilizing a liquid polymer/solvent mixture. This apparatus comprises a devolatilizing extruder having a barrel and a screw with a configuration coaxially and rotatably arranged therein, a motor for rotating the shaft and the screw configuration within the barrel, at least one jacket surrounding the barrel at a location where during processing mechanical work is put into the liquid polymer/solvent mixture in order to evaporate solvent and a source of cooling fluid connected to said jacket for circulating said cooling fluid through the jacket and cooling the barrel to remove heat from the liquid polymer/solvent mixture being at this location of mechanical working. This coolant source can in its simplest configuration be a pump circulating water through the jacket.

The preferred embodiment of this apparatus is one where the coolant circulation is automatically controlled. In this embodiment the apparatus is provided with sensing means to sense the power surging of the motor driving the screw and generating a surge signal representative of the average power surging. The apparatus is furthermore provided with control means controlling at least one of the flow rate and temperature of the coolant responsive to the surge signal such as to increase (decrease) the heat withdrawn from the fluid in the extruder when the power surging is higher (lower) than a setpoint.

It has been found very advantageous to circulate cooling water through the jacket of the extruder in the polymer working zone after the elastomer has been raised to working temperature. When the molten elastomer has reached this point, considerable solvent remains in the melt, requiring the further addition of heat. This heat can be supplied in two ways, by indirect heat transfer through the extruder barrel by circulating a hot fluid through the jacket and by mechanical working within this extruder zone. The potential for heat transfer through the barrel is limited by surface area and the poor heat transfer characteristics of the polymer. At the same time the effectiveness of mechanical working is hampered by the reduced viscosity of the hot melt which still contains a substantial amount of solvent. By circulating cooling water through the barrel jacket at this point, one sacrifices this means of heat input; indeed, heat is removed to achieve a degree of indirect control of the viscosity of the melt to a level which allows the extruder screw to effectively induce heat throughout the melt by mechanical working and thus effect vaporization of the remaining solvent. Since the vaporization process results in heat removal from the melt, the ideal situation would be to balance the mechanical heating with the two cooling processes, evaporation and indirect barrel cooling, which are proceeding simultaneously in this melt working zone. This is the balance that the invention attempts to maintain. It has further been found that the best measure of success in achieving the forementioned heat balance is by observing the power input to the extruder screw(s).

BRIEF DESCRIPTION OF THE DRAWINGS

The invention will yet be more fully understood from the following description of the drawing and the examples.

Figure 1:
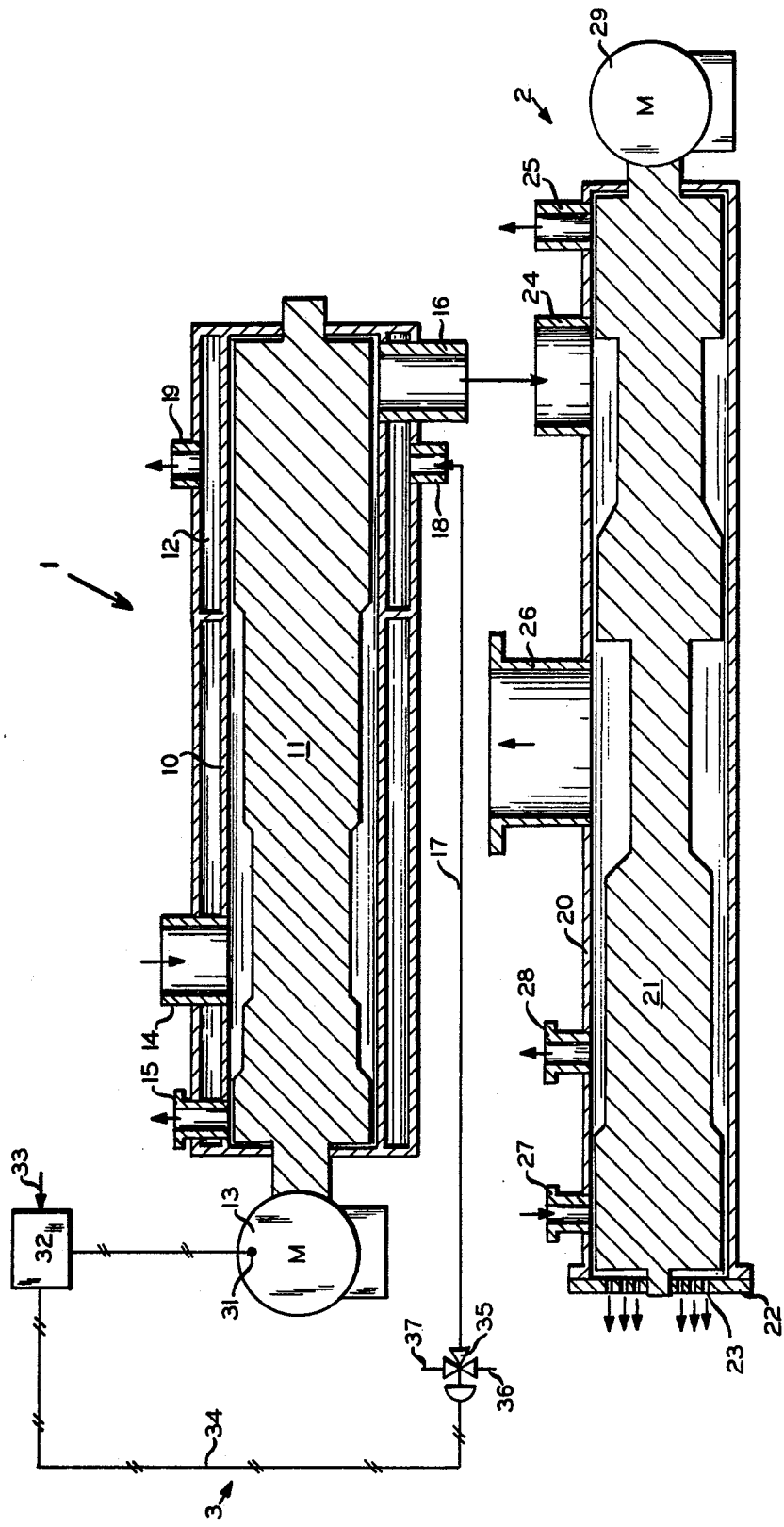
FIG. 1 schematically and partially in cross-section shows an apparatus for devolatilizing a liquid polymer/solvent mixture. This apparatus is essentially composed of two devolatilizing extruders 1 and 2 and control system 3. The first devolatilizing extruder 1 comprises a barrel 10 in which a screw 11 is rotatably arranged. This screw 11 has a varying cross-section as can be seen in the drawing. The screw 11 is composed of several elements each of which may have different pitch and/or depth. The screw or flight as such has not been shown in the drawing in order to render it more simple. The barrel 10 is surrounded by several jackets. The jacket that is most important for this invention is jacket 12. The screw 11 is rotated by motor 13. Into the inside of barrel 10 the liquid polymer/solvent mixture is introduced via inlet 14. Solvent vapors are removed via outlet 15 from the barrel. The partially devolatilized liquid polymer/solvent mixture is removed from the first extruder 1 via pipe 16.

In accordance with this invention, a coolant, e.g., water, is circulated through jacket 12. The coolant is introduced from line 17 via pipe 18 at the lower part of the barrel and is removed via pipe 19 from the upper part of the barrel.

The partially devolatilized liquid polymer/solvent mixture from pipe 16 is introduced into the second devolatilizing extruder 2 via pipe 24. This second devolatilizing extruder is also provided with a barrel 20 in which coaxially and rotatable screw 21 is arranged. This screw also has a changing diameter, the flights of which again for simplicity are not shown in the drawing. Solvent vapors are removed from the barrel via conduit 25 and via a vacuum vent 26. The polymer essentially free of solvent leaves the second devolatilizing extruder 2 via an end plate 22 which is provided with several outlet holes 23.

A small quantity of water may be introduced into the barrel and into admixture with the liquid polymer/solvent mixture via pipe 27. This water cools the polymer and leaves the barrel via outlet conduit 28. The shaft 21 is driven by the motor 29. The degree of surging of the power input by motor 13 is sensed by a unit 31 such as a thermal converter (kW meter) that delivers a signal that is representative of the average surging of the motor. This signal is converted into a control signal in a controller 32 in which the surging signal is compared with a setpoint signal 33. The resulting control signal 34 from controller 32 is utilized for operating and manipulating a three-way valve 35 which controls the temperature of the coolant by manipulating the relative quantities of hot coolant introduced via line 36 and cold coolant introduced via line 37 into the feed line 17 for the coolant.

Figure 2:
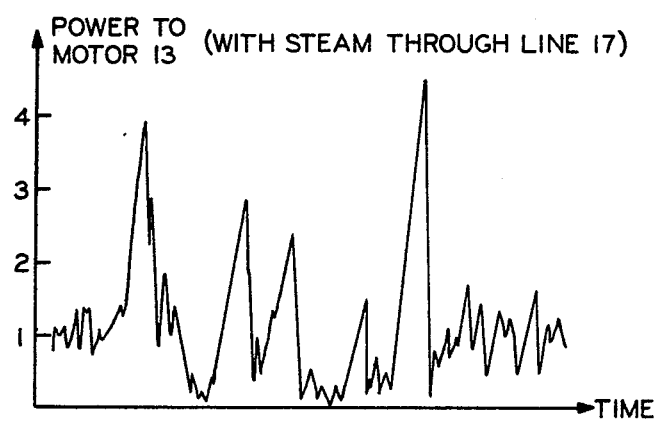
Figure 3:
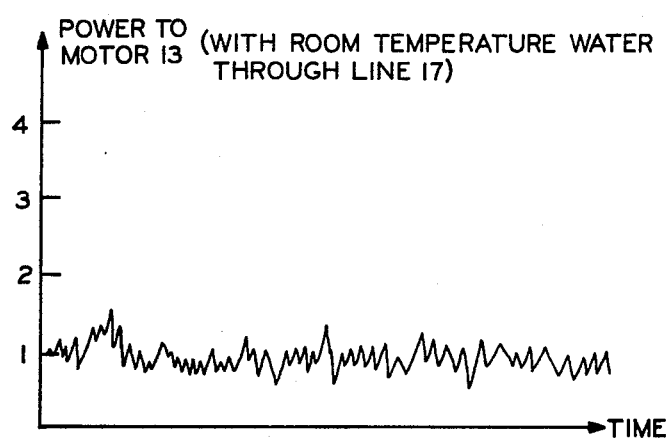

Reference is now made to FIGS. 2 and 3 of the drawing. These two figures show a reproduction of the power input shown by a recording wattmeter connected to the motor of extruder 1. In FIG. 2 the power input is shown for an operation with steam fed into jacket 12 whereas FIG. 3 shows the same operation with cooling water fed into jacket 12. The difference and the advantage of cooling is evident.

EXAMPLE I

In this example as extrusion devolatilization was carried out using two 2 inch diameter twin screw extruders operated in series. The apparatus used was similar to the one shown in FIG. 1 with the provision that both the extruder 1 and the extruder 2 were twin screw extruders.

The solution that was devolatilized was a random butadiene/styrene copolymer solution composed of 75% butadiene and 25% styrene in the monomer composition. The rubber as such is commercially available under the trademark Solprene ® 1204. This rubber was obtained by polymerization in cyclohexane using n-butyllithium as an initiator and tetrahydrofuran as a randomizing agent. The reaction was shortstopped with tin tetrachloride. After flashing the reactor effluent to about 28% solids, the solution of the butadiene/styrene copolymer in cyclohexane was fed to the extruder. The temperature of the solution was about 173°-174° C.

The jacket on the first extruder, that is shown as jacket 12 for extruder 1 in FIG. 1 of the drawing, was heated with 150 psig (1.14 MPa) steam of 186° C for Run 1 and was cooled with water of about 24° C for Runs 2 and 3. The average power inputs to the extruder are shown in the following table. Further comparative results shown in the following table are power surging, rubber feed rate capacity, as well as the solvent removal rates.

TABLE I

| Run No. | 1 | 2 | 3 |
|---|---|---|---|
| Polymer type, Solprene* | 1204 | 1204 | 1204 |
| Jacket medium | 150 psig (1.14 MPa) steam | Water at 24° C | Water at 24° C |
| Average power input to No. 1 extruder, kW | 4.75 | 5.75 | 5.25 |
| Power surging, No. 1 extruder, ΔkW | 3.0 | 1.0 | 0.5 |
| Average power input to No. 2 extruder, kW | 19.0 | 15.0 | 13.0 |
| Rubber concentration in feed, weight percent | 29 | 28 | 27 |
| Rubber feed rate, lb/hr (kg/hr) | 107 (48.5) | 115 (52.1) | 122 (55.4) |
| Solvent removal rate, No. 1 extruder, lb/hr (kg/hr) | 138 (62.5) | 200 (90.7) | 178 (80.6) |
| Solvent removal rate, No. 2 extruder, lb/hr (kg/hr) | 122 (55.4) | 95 (43.1) | 151 (68.4) |

*Trademark

From this table showing the comparative data of the invention in Runs 2 and 3 compared to the standard procedure in Run 1, the following important results can be seen: Caused only by cooling the jacket 12 of the extruder 1, the power surging has been reduced from 3.0 kW to 0.5–1 kW. Thus although the power input in the No. 1 extruder and the average was slightly larger in case of the water cooling than in case of the steam heating of the barrel, the chances of breakdown of the system due to overload of the motor driving the extruder No. 1 was considerably reduced by the invention.

The total power input of extruders 1 and 2 together for the runs of the invention, namely Runs 2 and 3 as compared to Run 1, has been significantly reduced although the rubber feed rate has also been significantly increased in case of Runs 2 and 3. Runs 2 and 3 show that the feed rate for the devolatilizing system of the present invention utilizing the water cooled jacket is considerably higher than the maximum rubber feed rate for the steam heated system.

Finally, the solvent removal rate achieved during water cooling of the barrel as opposed to the steam heating of the barrel is dramatically increased by the present invention. The solvent removal efficiency that can be expressed as pounds per hour of solvent removed per kilowatt also is obviously considerably higher in the case of the runs of the present invention as compared to the Run 1 utilizing the steam heated barrel. The reason the solvent removal rate in the No. 2 extruder is higher for Run 1 than for Run 2 is simply the fact that the solvent removal rate for extruder No. 1 in Run 2 has been so high already that there is only a relatively small quantity of solvent left to be removed whereas a much higher quantity of solvent in case of Run 1 is left to be removed.

EXAMPLE II

Example I was essentially repeated with the difference, however, that in the reference run instead of heating steam, neither steam nor water was used. This reference run is Run 4. The temperature of the cooling water in Runs 5 and 6 was 24° C. The polymer used in this Example II was also a 75/25 wt. % butadiene/styrene copolymer which, however, contained 37.5 parts by weight per 100 parts by weight of rubber of a highly aromatic oil and which had been stabilized with 0.75 parts by weight per 100 parts by weight of rubber of a butylated hydroxy toluene. The results of these three runs are shown in the following Table II.

TABLE II

| Run No. | 4 | 5 | 6 |
|---|---|---|---|
| Polymer type, Solprene* | 377 | 377 | 377 |
| Jacket medium | None | Water | Water |
| Average power input to No. 1 extruder, kW | 5.25 | 5.75 | 4.75 |
| Power surging, No. 1 extruder, ΔkW | 1.0 | 0.5 | 0.25 |
| Average power input to No. 2 extruder, kW | 16.0 | 16.0 | 15.0 |
| Rubber concentration in feed, | | | |

TABLE II-continued

| Run No. | 4 | 5 | 6 |
|---|---|---|---|
| weight percent | 34 | 32 | 30 |
| Rubber feed rate, lb/hr | 112 | 125 | 118 |
| (kg/hr) | (50.8) | (56.6) | (53.5) |
| Solvent removal rate, No. 1 extruder, lb/hr | 130 | 157 | 147 |
| (kg/hr) | (59.0) | (71.2) | (66.6) |
| Solvent removal rate, No. 2 extruder, lb/hr | 88 | 108 | 122 |
| (kg/hr) | (39.9) | (49.0) | (55.4) |

*Trademark

The results of this second example again show a considerable reduction in power surging achieved by the water cooling of this invention, a very significant increase in the maximum rubber feed rate or capacity of the system and an important increase in the solvent removal rate in extruder No. 1 attributable to the water cooling of this invention.

Reasonable variations and modifications that become apparent to those skilled in the art can be made in this invention without departing from the spirit and scope thereof.

I claim:

1. In a process for removing solvent from a liquid mixture of polymer and solvent in which a liquid mixture is introduced into a devolatilizing extruder operated to volatilize at least a portion of the solvent in the liquid mixture in the extruder with cooling of the liquid mixture by circulating a cooling fluid in contact with the extruder barrel and removal of solvent vapor and at least partly devolatilized polymer from the extruder, the improvement of: controlling the surging of a motor driving the extruder by the amount of cooling of the liquid mixture.

2. A process in accordance with claim 1 wherein that section of the extruder barrel is cooled wherein the highest amount of mechanical work is put into the liquid mixture.

3. A process in accordance with claim 1 wherein the flow rate of cooling fluid cooling the extruder is regulated directly responsive to the magnitude of the power surge of the motor.

4. A process in accordance with claim 1 wherein the temperature of the cooling fluid cooling the extruder is regulated inversely responsive to the power surge of the motor.

5. A process in accordance with claim 1 wherein said liquid mixture of polymer and solvent is a solution of a normally solid polymer or copolymer of alkadienes of 4–10 carbon atoms and arenes having one vinyl radical attached to the aromatic ring, said vinyl-substituted arenes having 8–14 carbon atoms per molecule, in a hydrocarbon solvent.

6. A process in accordance with claim 5 wherein said liquid mixture is essentially the effluent of a liquid phase polymerization reactor and consists essentially of a hydrocarbon solvent having 6–10 carbon atoms and a normally solid polymer or copolymer of butadiene, isoprene, styrene and methylstyrene.

7. A process in accordance with claim 6 wherein said solvent is cyclohexane.

8. A process in accordance with claim 7 wherein said liquid mixture is introduced into a first devolatilizing extruder with partial removal of the solvent therein and wherein a partially devolatilized liquid mixture from the first extruder is introduced into a second devolatilizing extruder to remove essentially all the rest of the solvent and wherein said liquid mixture is cooled in the first extruder to increase its viscosity and to increase the mechanical work put into the mixture as compared to the same operation without said cooling.

* * * * *